United States Patent [19]

Cork

[11] Patent Number: 4,491,555
[45] Date of Patent: Jan. 1, 1985

[54] DAMMING OF LOADING COIL CABLE INTERFACE

[75] Inventor: Fay E. Cork, Belvidere, Ill.

[73] Assignee: GTE Automatic Electric Labs Inc., Northlake, Ill.

[21] Appl. No.: 562,605

[22] Filed: Dec. 19, 1983

[51] Int. Cl.³ .................... B29C 27/30; H01B 13/20
[52] U.S. Cl. .................... 264/240; 174/20; 174/23 R; 264/261; 264/263; 264/265; 264/272.13; 264/272.19
[58] Field of Search .............. 264/1.5, 36, 46.5, 46.6, 264/46.7, 46.9, 240, 261, 263, 265, 272.13, 272.19; 156/48; 174/20, 23 R

[56] References Cited

U.S. PATENT DOCUMENTS

| | | | |
|---|---|---|---|
| 2,391,055 | 12/1945 | Kominer et al. | 156/48 |
| 3,427,393 | 2/1969 | Masterson | 174/23 R |
| 3,507,949 | 4/1970 | Campbell | 264/263 |
| 4,008,197 | 2/1977 | Brauer et al. | 174/23 R |
| 4,103,136 | 7/1978 | Karakis et al. | 174/23 R |
| 4,171,998 | 10/1979 | Brauer et al. | 264/36 |
| 4,281,210 | 7/1981 | Brauer et al. | 174/23 C |

Primary Examiner—James Lowe

[57] ABSTRACT

A method of providing a dam in a loading coil case for the blocking of an encapsulant solutions penetration into the cable beyond a desired distance by inserting, via a hypodermic needle, a quantity of encapsulant activator at the desired site of a dam. The encapsulant upon contacting the activator jells very rapidly preventing the remaining encapsulant from draining into the cable.

3 Claims, 1 Drawing Figure

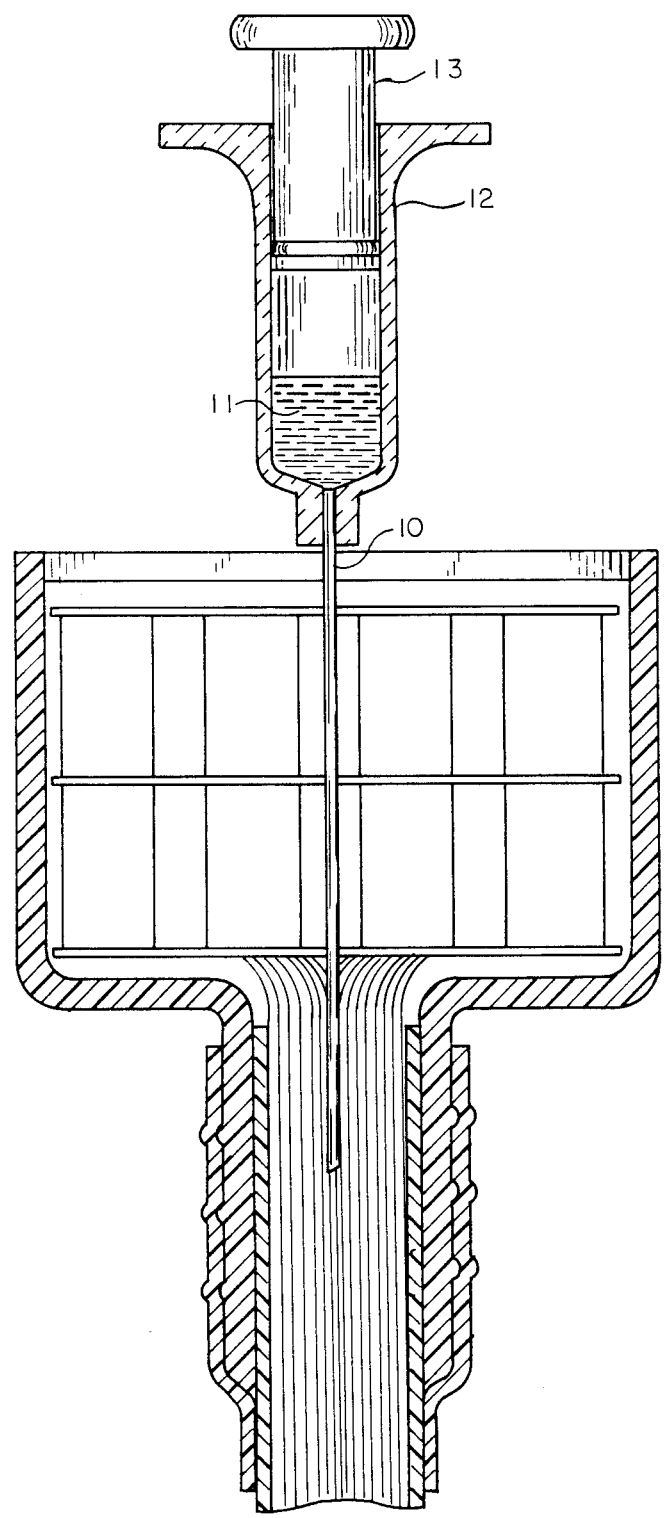

DAMMING OF LOADING COIL CABLE INTERFACE

FIELD OF THE INVENTION

This invention relates to cables in general and more particularly to a method and apparatus for creating a dam, when applying a water repellant into the cable core, at the entry interface of a loading coil package.

BACKGROUND OF THE INVENTION

Multi-conductor communication cables are currently insulated with plastic but still are not waterproof. Water can enter the cable jacket and destroy the cables usefulness. There have been many attempts at building barriers to such leakage of water. The remedy currently adapted to combat this problem has been to fill the voids between the conductors with a water repellant substance. Further, with the necessity to use loading coils in the cable it is also necessary to protect the loading coil. These are commonly grouped in a case with a cable stub that must be spliced onto the cable. This cable stub, however, must remain workable until after installation and therefore cannot be filled prior to installation, while it is preferable that the coils be sealed at the manufacturing site. This therefore requires a dam within the cable at the interface with the loading coil package.

Polyurethane of low viscosity is the desired filler for the loading coil assembly, but it penetrates to an excessive depth into the cable. This then makes the cable difficult to handle at the time of installation due to its rigidity. Numerous processes were used at various times in the past and some are still in use. However, all of the processes leave much to be desired and all are very labor intensive.

Examples of some of these processes are the use of small quantities of the potting material being applied and allowing adequate time to jell between applications; band clamps to restrict the diameter of the cable; internal plugs inserted to make a desired area in the cable more dense and thus impede the flow of the polyurethane beyond the desired point; and fast setting polyurethane among others.

SUMMARY OF THE INVENTION

Accordingly, this invention provides a new and improved encapsulating method which provides the desired handling features with enhanced environmental protection and facilitates its manufacture.

This improvement is achieved by the insertion of a predetermined amount of an encapsulant system activator into the cable at the desired dam site, after which the encapsulant is placed in during cable preparation in the normal process of preparation. The encapsulant then jells almost immediately at the activator-encapsulant interface upon coming in contact with the activator.

BRIEF DESCRIPTION OF THE DRAWING

A more complete understanding of the advantages and structure of the present invention may be had by reference to the following detailed description when taken in conjunction with the accompanying drawing of a sectional view of a loading coil case and cable stub.

DESCRIPTION OF THE PREFERRED EMBODIMENT

Referring to the drawing, a plastic loading coil case 1 is shown in section, which includes a body portion and a transition stub 2. A number of loading coil stacks 6 are shown spaced apart by mounting discs 7. A cable 5 is shown entering the assembly via stub 2 with the exterior sealed by a short length of shrinkable tubing 3.

A hypodermic syringe 12 having a plunger 13 and an amount of activator 11 terminated by a small diameter (approximately $\frac{1}{8}$") hypodermic needle 10, the length of which is determined by the depth in the cable where the dam is desired, is inserted between the conductors of the cable to its full length into the cable. When in position, a predetermined amount, a few CCs according to the size of the cable, of the polyurethane system activator 11 is injected from the needle. This activator drastically accelerates the solidification of the polyurethane system which comes into contact with it. The activator is placed in during cable preparation and the normal processes of filling in the voids between the coils and wires with an encapsulant are followed thereafter.

A low viscosity material for improved dielectric and moisture proofing can now be used. The complete unit can be potted at one time and as the initial system comes into contact with the activator, it will jell almost immediately to form a dam and prevent further penetration into the cable. The remainder of the material goes through a normal slow cure time for improved sealing.

What is claimed is:

1. In a method of applying a water repellant substance into a loading coil container including a protruding cable stub; the step of:
    injecting a polyurethane system activator through the container a predetermined distance into the cable, thereafter pouring into said container in a single operation a low viscosity polyurethane, thereby forming a dam at said system activator and polyurethane interface and moisture sealing said container simultaneously.

2. A method of applying a water repellant substance as claimed in claim 1, wherein said injecting is done using a hypodermic needle.

3. A method of applying a water repellant substance as claimed in claim 1 further including the step of curing the low viscosity polyurethane above said dam.

* * * * *